United States Patent [19]

McKiernan et al.

[11] Patent Number: 5,079,950
[45] Date of Patent: Jan. 14, 1992

[54] LEVEL INDICATING IN VEHICLE HOLDING TANKS

[75] Inventors: Edward McKiernan; Ronald J. Bailey; James A. Sigler, all of Big Prairie, Ohio

[73] Assignee: Sealand Technology, Inc., Big Prairie, Ohio

[21] Appl. No.: 517,679

[22] Filed: May 3, 1990

[51] Int. Cl.⁵ .................. G01F 23/12; H01H 36/00
[52] U.S. Cl. .......................... 73/313; 29/622; 73/311; 73/319; 73/DIG. 5; 200/84 C; 340/624
[58] Field of Search ............... 73/319, 322, 314, 308, 73/313, 311; 200/84 C; 340/623, 624; 137/423, 392, 431; 29/602 R, 622

[56] References Cited

U.S. PATENT DOCUMENTS

| | | | |
|---|---|---|---|
| 1,978,392 | 10/1934 | Von Brockdorff | 73/311 X |
| 3,218,857 | 11/1965 | Van Woert | 73/322 X |
| 3,359,799 | 12/1967 | Lubin | 73/322 X |
| 3,548,659 | 12/1970 | Ellis | 73/314 |
| 3,691,839 | 9/1972 | Lasher | 73/322 |
| 3,815,416 | 6/1974 | Portis | 73/314 X |
| 4,170,136 | 10/1979 | Martineau | 73/322 |
| 4,178,802 | 12/1979 | Yamamoto | 73/313 |
| 4,186,419 | 1/1980 | Sims | 200/84 C X |
| 4,268,953 | 5/1981 | Tetro | 29/622 X |
| 4,386,525 | 6/1983 | Mooney | 73/292 X |
| 4,475,290 | 10/1984 | Colditz | 73/314 X |
| 4,480,469 | 11/1984 | Tice | 200/84 C |

Primary Examiner—Daniel M. Yasich
Attorney, Agent, or Firm—Nixon & Vanderhye

[57] ABSTRACT

A level indicating assembly for use in a tank mounted in a vehicle, such as an RV or boat, includes a fitting body for mounting the assembly in the top of the tank, and probes extending through the body into the tank. At least one of the probes has a hollow probe shaft which is of a flexible material such as flexible pvc. One of the probes provides an "empty" indication for the tank, while the other probes provide a "full" indication, and a mid-level indication. A socket or like element with a knock-out plug optionally provides a vent in the fitting body. During installation the position of the probe shafts with respect to the fitting body are adjusted, and any unneeded portion of the probe shaft above the shaft fitting is cut off.

20 Claims, 2 Drawing Sheets

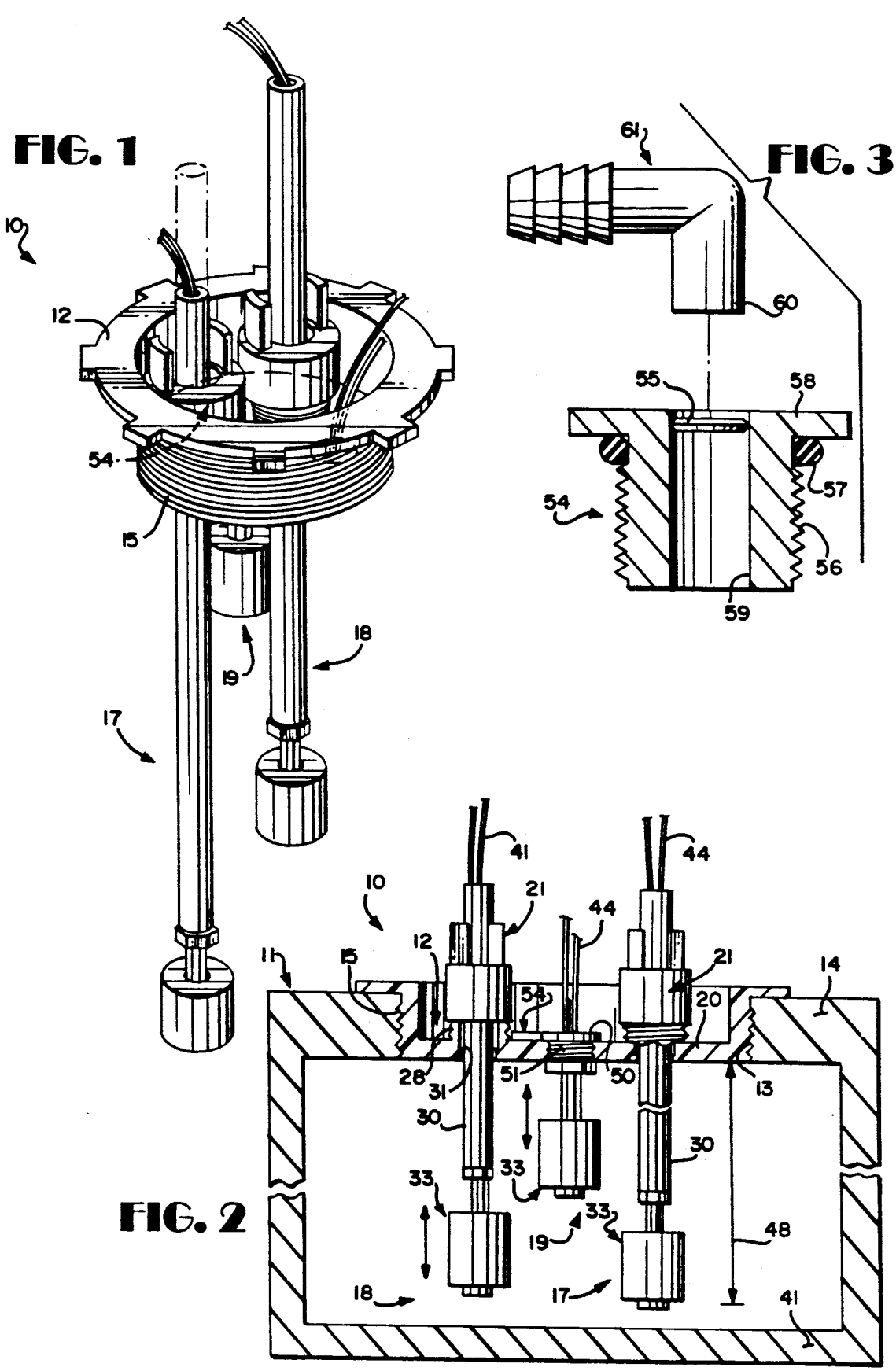

LEVEL INDICATING IN VEHICLE HOLDING TANKS

BACKGROUND AND SUMMARY OF THE INVENTION

It is necessary to provide an indication of the level of fluid within many different types of tanks. For example, for holding tanks in sewage treatment systems on vehicles, it is necessary to know when the tank is full, or approaching full, so that it can be emptied. Typical conventional sensors for such tanks, such as those sold under the trademarks "SANX ®" and "TANK-WATCH ®" by Sealand Technology, Inc. of Big Prairie, Ohio, indicate when the tank is full, or when the tank is three-quarters full and then full. Such sensors typically include one or more probes which extend into the tank. The probes comprise a hard plastic or brass probe shaft, and a sensor—such as a magnet slideable with respect to a reed switch—mounted at the bottom of the shaft. While conventional sensors are successful in sensing the full level of tanks, there are some circumstances when it is desirable to also sense the empty level of a tank.

The sensing of an empty level of a holding tank or the like—especially one that is mounted in a vehicle (such as a recreational vehicle, boat, or the like)—can be difficult to implement. If there is any substantial volume of fluid (which typically includes liquid, solids, and/or semi-solids in a holding tank) within the tank, as the vehicle moves along, rocks back and forth, brakes, accelerates, and the like, the dynamic forces applied by the fluid sloshing around inside the tank—which forces may be violent—can have adverse effects on the probes. Typically if the probe is long—and it may need to be up to about 22 inches long for conventional recreational vehicle or boat holding tanks—the moment applied to the probe can result in permanent bending or fracture of the hard plastic (rigid pvc) or metal (brass) probe shaft.

According to the present invention, a level indicating assembly for use in a tank, particularly for use in a tank in a vehicle such as an RV or a boat—is provided which is capable of sensing the tank empty condition, but will not prematurely fracture or deform as a result of violent slosh of fluid within the tank. According to the present invention this is accomplished by providing the probe shaft of a flexible material, such as flexible pvc tubing. Thus, the shaft may readily bend when subjected to forces within the tank as the tank moves, but will not break.

According to the present invention it has also been recognized that it is desirable to provide an "empty" indicator for holding tanks or the like, especially associated with vehicles. While a "full" indicator tells one when to empty the tank, when one is in the process of emptying the tank one is never sure when the tank is empty. Since emptying often is done utilizing a pump, if the emptying operation continues for a significant period of time after all the liquid, solids, and semi-solids have been removed from the tank and the pump sucks air, this may result in damage to the pump, particularly impeller type pumps. Alternatively, depending upon the tank construction, this may result in a vacuum being pulled in the tank, with subsequent damage to the interior of the tank or other tank components. These difficulties are avoided by providing an empty indicator in a holding tank or the like.

In order to provide an empty indicator for a holding tank that is commercially practical, there must be some adjustability in the probe length to accommodate different depths of tanks. For example commercial holding tanks may have depths ranging from about a foot to about two feet. Therefore it is desirable to provide a tank indicator assembly which has at least one probe shaft that is adjustable with respect to the tank fitting for the assembly. Therefore according to one aspect of the present invention there is provided a method of installing a tank level indicator in a tank using a fitting body having at least one probe associated therewith, the probe having a hollow shaft extending through a shaft fitting on the fitting body, and a sensor mounted at a first end of the shaft, and electrical wires extending from the sensor through the shaft, comprising the steps of: (a) Mounting the fitting body in the top of the tank. (b) Adjusting the position of the probe shaft with respect to the fitting body and shaft fitting so that the sensor on the probe shaft is at the desired position within the tank. (c) Cutting off any unneeded portion of the probe shaft extending above the shaft fitting. And, (d) connecting up the electrical wires associated with the probe to an indicator. Typically at least two probes having probe shafts are provided, and steps (b) through (d) are practiced for each. Step (b) is practiced for one of the probes so that the sensor is at or adjacent the bottom of the tank and thereby provides an "empty" indicator, while the other shaft is adjusted so that it senses a mid-level filling of the tank (e.g. one-half or three-quarters full). It is also desirable to provide a socket in the fitting body which has knock-out plug in it, and to knock out that plug if the socket is to serve as a vent, but to leave the plug in if the socket is not to vent the tank.

It is particularly desirable according to the present invention to provide "empty", mid-full, and "full" indications in a holding tank, particularly one associated with a vehicle. According to this aspect of the invention, a level indicating assembly for use in a tank adapted to be mounted in a vehicle is provided, the assembly comprising the following elements: A fitting body for fitting the assembly in operative association with a tank. First and second probes, each having a hollow probe shaft with electrical wires extending therethrough, and extending through the body, and a sensor element on the end of the shaft. And, a third probe sensor mounted directly to the fitting body. Shaft fittings for fitting the first and second probe shafts to the fitting body are provided which include means for allowing adjustment of the position of the probe shafts with respect to the fitting body. Typically the means for allowing adjustment of a probe shaft with respect to the fitting body comprise a collar of resilient material frictionally engaging the shaft, and locating means in the shaft fitting for receipt of the collar. The sensors are connected up by electrical wires to "empty", mid-level and "full" indicating means, such as indicator lights. Each of the sensors preferably includes an elongated central portion having a first vertical length and a condition responsive electrical element, such as a reed switch, therein near one vertical end thereof. Each sensor also includes an exterior float having a second vertical length less than the first, and movable with respect to the central portion, and having a condition generating element—such as the permanent magnet for use with the reed switch—for operating the reed switch when in substantial vertical alignment therewith. The condition responsive electrical elements are mounted near the top of the central portion for the second and third probes, and near the bottom of the central portion for the first probe, for maximum efficiency in sensing the various conditions sensed by the probes.

It is the primary object of the present invention to provide an effective level indication for a tank, particularly for a holding tank or the like adapted to be mounted in a vehicle, and a method of installation thereof. This and other objects of the invention will become clear from an inspection of the detailed description of the invention and from the appended claims.

BRIEF DESCRIPTION OF THE DRAWINGS

FIG. 1 is a top perspective view of an exemplary assembly according to the present invention;

FIG. 2 is a side view, partly in cross-section and partly in elevation, of the assembly of FIG. 1 shown mounted in a conventional holding tank;

FIG. 3 is a side view, partly in cross-section and partly in elevation, of a vent socket of the assembly of FIGS. 1 and 2;

DETAILED DESCRIPTION OF THE DRAWINGS

Figure 4:
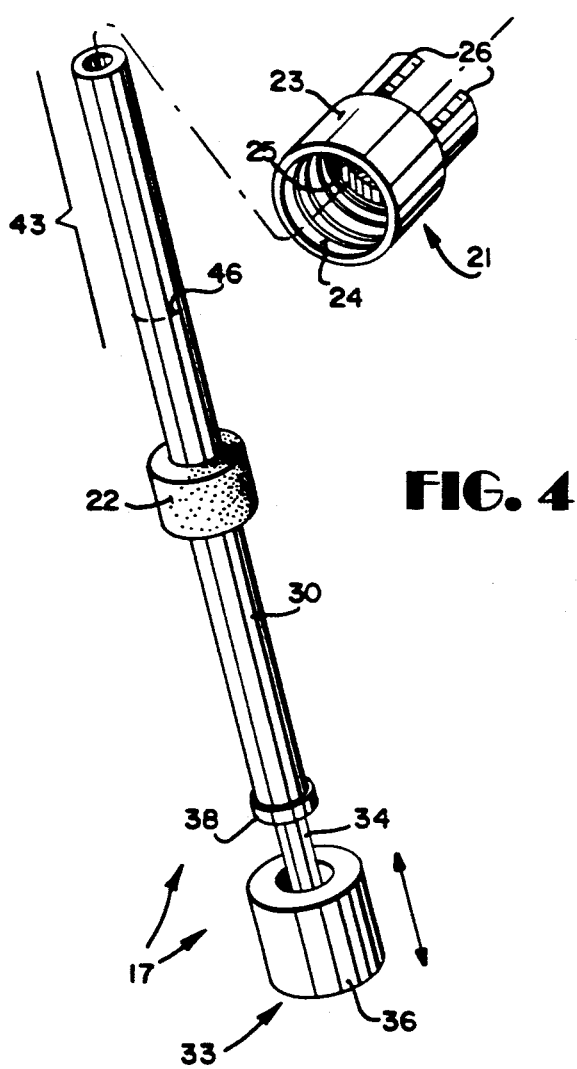
FIG. 4 is an exploded perspective view of a probe shaft and fitting of the assembly of FIG. 1.

An exemplary level indicating assembly according to the present invention is shown generally by reference numeral 10 in FIGS. 1 and 2. The assembly 10 is adapted to be mounted in a tank, such as a holding tank 11, and is particularly useful for tanks 11 that are mounted in vehicles, such as recreational vehicles, boats, and the like.

The assembly 10 includes as one of the major components thereof a fitting body 12 for fitting the assembly 10 in operative association with a tank 11. The body 12 is preferably made of a hard plastic material such as rigid pvc, or other material that will stand up to the environment of the interior of the tank 11, and preferably is fitted within an opening 13 within the top 14 of a tank 11 by external screw threads 15 which cooperate with internal screw threads formed within the opening 13.

The assembly 10 also includes at least one probe—and in the preferred embodiment actually illustrated in the drawings three probes, although more can be provided—associated therewith, which probes are indicated in general by reference numerals 17, 18, and 19. Each of the probes 17 and 18 are preferably mounted to the main plate 20 of the body 12 by a shaft fitting 21 and a collar 22 of resilient material, such as natural or synthetic rubber or other elastomer. The fitting 21 comprises a cap body 23 having a hollow interior with interior screw threads 24, and an upper annular portion 25 which provides a seat for locating the collar 22. Finger engaging extensions 26 extend upwardly from the top of the cap 23, which can be grasped by the user to screw and unscrew the cap onto an upwardly extending externally threaded fitting 28 (see FIG. 2) on the plate 20.

The collar 22 of elastomeric material frictionally retains the hollow probe shaft 30 within the fitting 21, engaging at the top surface thereof the annular element 25, and at the bottom thereof a like annular element 31 (see FIG. 2) at the bottom of the exteriorly threaded fitting 28. The position of the probe shaft 30 with respect to the collar 22 can be adjusted by grasping both and sliding the collar 22 with respect to the shaft 30. Even though such linear movement between them is possible, it is difficult, and thus the shaft 30 is properly frictionally retained in any position to which it has been moved relative to the collar 22 by fitting 21.

Instead of making the collar 22 of elastomeric material, it could use a swedge lock or other standard mechanism for retaining it in the position to which it has been moved on the shaft 30.

According to one aspect of the present invention, instead of making the shaft 30 of a rigid material such as pvc or brass, it is made of a flexible material such as flexible pvc tubing. The shaft 30 must have sufficient flexibility so that even if the shaft 30 is on the order of 10-24 inches long and is mounted in a tank 11 as illustrated in FIG. 2, the sloshing (sometimes violent) of fluid (including liquid, solids, and/or semi-solids) within the tank 11 will not break or deform the shaft 30, but only effect resilient bending thereof.

Figure 5:
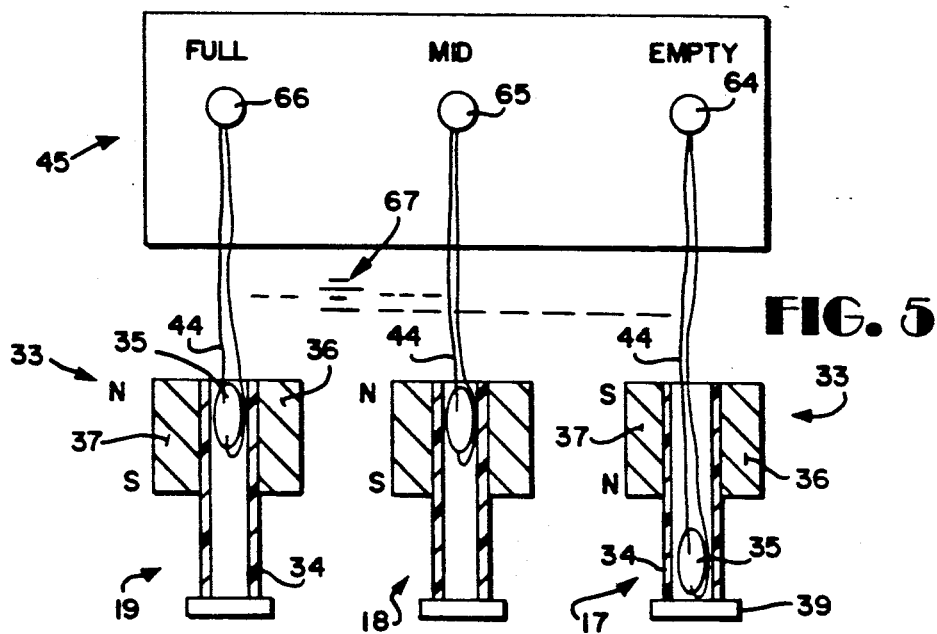
FIG. 5 is a schematic view illustrating the operative interconnections between the probe sensors and indicator lights in the preferred form of assembly according to the invention.

Mounted at the bottom end of the shaft 30 (for disposition within the tank 11) is a level sensor shown generally by reference numeral 33. The level sensor per se is conventional in the art, as exemplified by the conventional SANX ® level sensing assemblies. That is, the sensor 33 includes a central portion (hollow shaft stub) 34 with a reed switch 35 (see FIG. 5) mounted therein, with a surrounding slideable float collar 36 which includes a magnet 37 for actuating the reed switch 35. The length of the central portion 34 from the mounting ring 38 thereof to the end of the probe shaft 30 (the stop 39 on the bottom thereof) is greater than the length of the float collar 36 so that the collar 36 is movable by the fluid level from one position in which the reed switch 35 is not actuated by the permanent magnet 37, to another position in which it is. FIG. 5 shows the reed switches 35 associated with the probes 18, 19 in the position where they are actuated by the magnets 37 associated therewith, while in FIG. 5 the probe 17 the reed switch 35 is not actuated.

Utilizing the apparatus as illustrated in FIGS. 1, 2, 4, and 5, a method of installation of the tank level indicator 10 is provided which allows the probes 17 through 19—and particularly the depths.

The probe 17 typically will be an "empty" tank indicator, and therefore the shaft 30 thereof will have the greatest length, and the sensor 33 thereof will be located on (that is the stop 39 thereof abutting) the bottom 41 of the tank 11, or adjacent the bottom (as illustrated in FIG. 2). However since the bottom 41 may typically—in present commercial installations—be anywhere from about a foot to about two feet from the top 14 of a tank 11, the shaft 30 associated with the probe 17 must initially be about 24 inches long. Once the body 12 is mounted on the tank 14 in the correct position of the shaft 30 with respect to the body 12 adjusted, any unneeded portion of the shaft 30 extending above the top of the shaft fitting 21 is preferably removed. For example in FIG. 4, the top portion 43 of the shaft 30 might extend above the fitting 21 after the probe 17 has been properly positioned in the tank 11. This excess portion 43 is then cut off by the installer, using a sharp edge, snips, or the like taking care not to cut the electrical wires 44 extending from the probe to the indicator panel 45 (see FIG. 5), and it is removed. The excess portion 43 may—after severing along line 46—be slid out over the free ends of the wires 44 and then disposed of, or if the wires 44 have already been connected the portion 43 can also be slit vertically and opened up around wires 44.

In a typical installation, the length of the probe 17—designated by reference numeral 48 in FIG. 2—within the tank 11 is about 10-24 inches, and the tube 30 must have sufficient flexibility to bend but not break when moment arms are applied thereto by sloshing of fluid within the tank 11.

The probe 19, unlike the probes 17 and 18, preferably is not adjustably mounted with respect to the body 12 since the probe 19 will serve merely as the "full" indicator, and therefore can be positively and stationarily positioned with respect to the plate 20. Permanent mounting may be provided by a nut 50 (see FIG. 2) which engages the top of an externally threaded portion 51 of the probe 19, and the nut 50—especially if of plastic material, such as rigid pvc—may be ultrasonically welded in place once tightened. In this way the probe 19 is maintained positively in place with the sensor 33 thereof adjacent the top of the tank 11, indicating a full condition of the tank.

There are some installations in which it is desirable or necessary to provide a vent for the tank 11, and other installations in which it is not. The assembly 10 according to the present invention is constructed so that it may either provide a vent, or not provide a vent, as desired. This is accomplished according to the invention by providing a socket 54 (see FIGS. 1 through 3) with a knock-out plug 55 (see FIG. 3) therein. The socket 54 has external screw threadings 56 which engage an internally threaded opening (not shown) in the plate 20, and an O-ring seal 57 may be provided between the socket upper flange 58 and the plate 20 to seal the opening into which the socket 54 is threaded. During installation if it is desired for the assembly 10 to provide a venting function, the knock-out plug 55 is merely impacted with an appropriate tool so that it detaches from the hollow interior 59 of the socket 54, and then the bottom end 60 of a vent fitting 61 is inserted into the top of the opening 59. If no vent is desired, the knock-out plug 55 is merely maintained in place.

The vent can be provided by an element formed integrally with the main plate 20 instead of providing a separate socket 54.

FIG. 5 schematically illustrates the interconnections between the probes 17 through 19 and indicator lights 64, 65, and 66 respectively on an indicator panel 45. Of course all of the lights 64 through 66 are connected up to a source of power, such as a battery 67 (shown only schematically in FIG. 5), so that when the reed switches 35 of the various probes 17 through 19 are closed, the indicator lights will be energized. Note that for the probe 17 the reed switch 35 is located adjacent the bottom of the central portion 34 so that when the floating collar 36 has liquid beneath it the reed switch 35 will be open, and only when there is no liquid beneath the floating collar 36 does the magnet 37 move to close the reed switch 35 and thereby energize the "empty" light 64. For the probes 18 and 19, the reed switches 35 are located adjacent the top of the central portion 34 so that only when the floating collars 36 are buoyed upwardly by liquid within the tank 11 at the positions of the sensors 33 will the switches 35 be closed. Note that the sensor 18 may have a probe shaft 30 thereof adjusted to any desired length so that it can sense any mid-tank level condition desired. Typically the probe 18 would be positioned so that the sensor 33 thereof was at the one-half or three-quarters full level in the tank 11, but that is a matter of preference which can be adjusted during installation by moving the shaft 30 with respect to the fitting 21 for the probe 18, and cutting off any excess portion, as described above with respect to the probe 17.

It will thus be seen that according to the present invention an indicator assembly and method of installation thereof have been provided which are especially useful when in association with holding tanks on vehicles, providing great versatility and adaptability to different types and depths of tanks, and allowing continued operation over long periods of time even when an "empty" indication is provided. While the invention has been herein shown and described in what is presently conceived to be the most practical and preferred embodiment thereof, it will be apparent that many modifications may be made thereof within the scope of the invention. For example the method described above need not be used merely with flexible tubing, but also can be used with rigid probe shafts. Further, the provision of an empty indicator for vehicle holding tanks may be provided in general, regardless of the probe and probe shaft specifics. Thus the invention is to be accorded the broadest interpretation of the appended claims so as to encompass all equivalent structures and procedures.

What is claimed is:

1. A level indicating assembly for use in a tank, having an opening in a top portion thereof mounted in a vehicle, said assembly comprising:
   a fitting body for fitting said assembly in an opening in said tank;
   at least two probes extending through said body and said opening in said tank generally vertically downwardly and having an elongated hollow probe tube, and a level sensing means having a sensor mounted on the end of said tube to indicate when a level is reached, said level sensor coating with means in said probe shaft to indicate when a probe level in the tank has been reached, with electrical connections passing through said tube hollow interior through said body; and
   said probe tube constructed of a resilient material having sufficient flexibility so that it will bend but not break or deform even if there is violent sloshing of fluid within a tank into which said probe extends.

2. An assembly as recited in claim 1 wherein said probe tube is constructed of flexible pvc.

3. An assembly as recited in claim 1 wherein said probe tube has a length from said fitting to said sensor of about 10-24 inches.

4. An assembly as recited in claim 1 wherein said at least one probe comprises at least first and second probes, each having a follow probe tube, and a third probe sensor mounted directly to said fitting body.

5. An assembly as recited in claim 4 wherein said fitting body further comprises a hollow element having a knock-out plug therein, said element functioning as a vent when said knock out plug is removed, and not functioning as a vent when said knock out plug is in place.

6. An assembly as recited in claim 1 wherein said first probe has a shaft long enough so that said sensor thereof is mounted on or adjacent said tank bottom, and said second probe has a shaft long enough so that said sensor thereof is mounted at a mid point of said tank, between said top and bottom, and wherein said third probe sensor is adjacent said top of said tank.

7. An assembly as recited in claim 6 further comprising "empty", mid level, and "full" indicating means, and electrical wires interconnecting said first, second and third probes to said "empty", mid level, and "full" indicating means, respectively.

8. An assembly as recited in claim 7 wherein each of said sensors comprises: an elongated central portion having a first vertical length and a condition responsive electrical element therein near one vertical end thereof; and an exterior float having a second vertical length less than said first length, and movable vertically with respect to said central portion, and having a condition generating element associated therewith for operating said condition responsive electrical element when in substantial vertical alignment therewith.

9. An assembly as recited in claim 8 wherein said condition responsive electrical elements are mounted near the top of said central portion for said second and third probes, and near the bottom of said central portion for said first probe.

10. An assembly as recited in claim 9 wherein said condition responsive electrical element comprises a reed switch, and said condition generating element comprises a magnet.

11. A level indicating assembly for use in a tank, having an opening in a top portion thereof, mounted in a vehicle, said assembly comprising:

a fitting body for fitting said assembly in said opening in said tank;

first and second probes of a level sensing means, each having a hollow probe tube with electrical wires extending therethrough, and extending through an opening of said fitting body generally vertically into said tank, and a level sensor on the end of said tube electrically connected with means on the interior of said probe tube to index when a probe level has been reached; and a third probe sensor mounted directly to said fitting body.

12. As assembly as recited in claim 11 further comprising tube fittings for fitting said first and second probe tubes to said fitting body, and including means for allowing adjustment of the position of said probe tube with respect to said fitting body.

13. An assembly as recited in claim 12 wherein said means for allowing adjustment of a probe tube with respect to said fitting body comprise a collar frictionally engaging said tube, and locating means in said tube fitting for receipt of said collar.

14. An assembly as recited in claim 12 wherein said fitting body further comprises a hollow element having a knock-out plug therein, said element functioning as a vent when said knock-out plug is removed, and not functioning as a vent when said knock-out plug is in place.

15. An assembly as recited in claim 11, wherein said first probe has a tube long enough so that said level sensor thereof may be mounted on or adjacent said tank bottom, and said second probe has a tube long enough so that said level sensor thereof may be mounted at a mid point of said tank, between said top and bottom, and wherein said third probe sensor is adjacent said top of said tank.

16. As assembly as recited in claim 15 further comprising "empty", mid level, and "full" indicating means, and electrical wires interconnecting said first, second and third probes to said "empty", mid level, and "full" indicating means, respectively.

17. A method of installing a tank level indicator in a tank using a fitting body with an opening therein, having at least one probe associated therewith, the probe having a hollow tube extending through a tube fitting on the fitting body and level sensing means mounted at a first end of the tube and having a sensor coacting with a device in the probe tube to indicate when a probe level in the tank has been reached, and electrical wires extending from the level sensor means through the shaft; comprising the steps of:

(a) mounting the fitting body in a top portion of the tank with the tube extending through the tank opening generally vertically into the tank;

(b) adjusting the position of the probe tube with respect to the fitting body and tube fitting so that the level sensor on the probe shaft is at a desired vertical position within the tank;

(c) cutting off any unneeded portion of the probe tube extending above the tube fitting; and (d) connecting up the electrical wires of the probe to an indicator.

18. A method as recited in claim 17 wherein at least two probes having probe tubes are provided and the steps (b)-(d) are practiced for each; and wherein the step (b) is practiced for one of the probes so that the sensor is at or adjacent the bottom of the tank so as to give an empty tank indication.

19. A method as recited in claim 18 wherein the tank is a holding tank in a vehicle, and wherein: steps (a)-(d) are practiced while the tank is in the vehicle.

20. A method as recited in claim 17 wherein the fitting body includes an element with a vent passage therein, and a knock-out plug in the vent passage; and comprising the further step (e) of—when it is desired to provide a vent for the tank—knocking out the knock-out plug.

* * * * *